M. H. LOCKWOOD.
TYPE WRITING MACHINE.
APPLICATION FILED AUG. 7, 1912.
1,143,212.
Patented June 15, 1915.
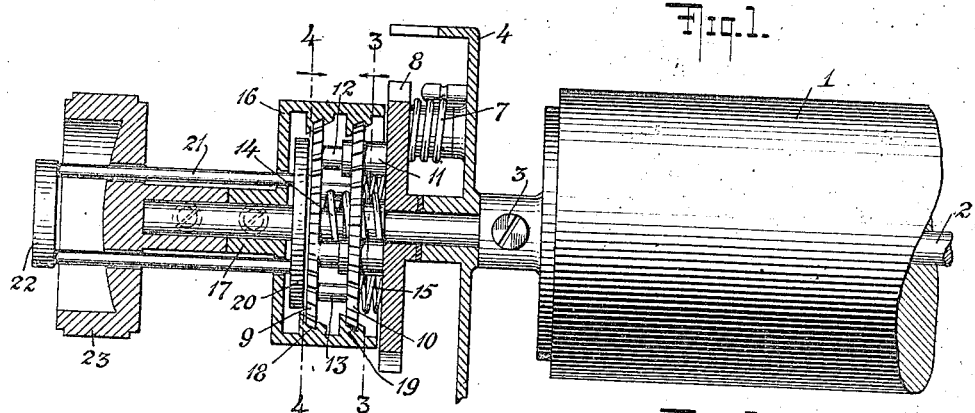
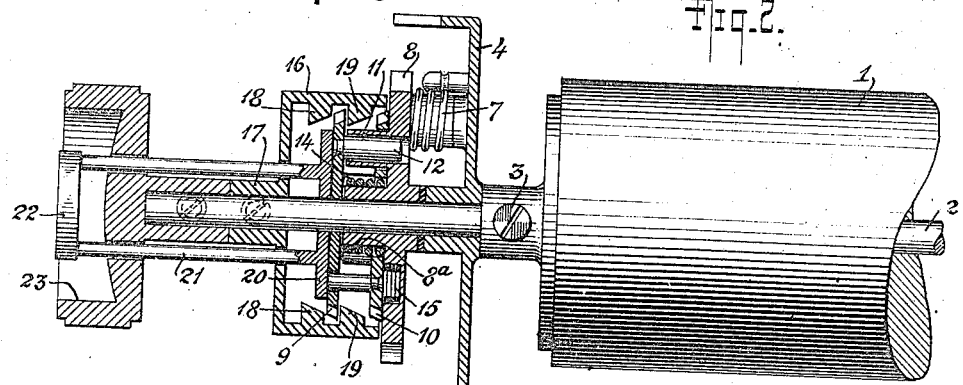
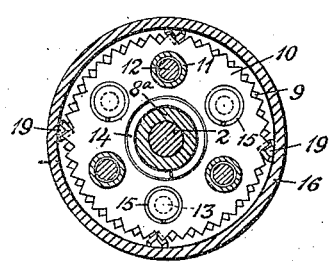
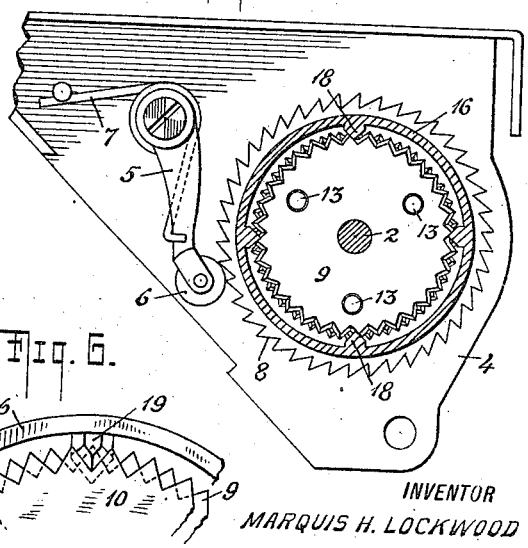
WITNESSES
INVENTOR
MARQUIS H. LOCKWOOD
BY
ATTORNEYS

UNITED STATES PATENT OFFICE.

MARQUIS H. LOCKWOOD, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,143,212.

Specification of Letters Patent. Patented June 15, 1915.

Application filed August 7, 1912. Serial No. 713,787.

*To all whom it may concern:*

Be it known that I, MARQUIS H. LOCKWOOD, a citizen of the United States, and resident of the borough of Manhattan, city, county, and State of New York, have invented certain new and useful Improvements in Type-Writing Machines, of which the following is a specification.

My invention relates more particularly to a platen release mechanism whereby the platen may be readily released from the line space wheel and rotated independently thereof to any desired point and again connected so that both shall rotate in unison.

The object of my present invention is to accomplish these results in a simple manner and in such a way that the connection between the platen and line space wheel will be positive and without the possibility of one member slipping with respect to the other. At the same time the arrangement is such that the release is accomplished by a direct thrust of the finger actuated device against movable disks. Two movable disks are provided and in the form of the device here shown connected with the line space wheel, each with a plurality of V-shaped teeth adapted to coöperate with elongated wedge shaped teeth connected with the platen through the inclosing case and platen axle. Each disk coöperates with a set of the wedge shaped teeth on the interior of the inclosing shell, the teeth of one disk being advanced circumferentially with respect to the other a half tooth space. By this arrangement it will be seen that, since the disks are independently spring actuated, one or both disks will engage their respective sets of wedge teeth, the amount of engagement depending upon the relative positions of the line space wheel and platen.

In the drawings Figure 1 is a partial section representing the device in locked position; Fig. 2 is a similar view with the platen released; Fig. 3 is a cross section at 3—3 of Fig. 1; Fig. 4 is a cross section at 4—4 of Fig. 1; and Figs. 5 and 6 are enlarged fragmentary views illustrative of the action of the device.

My device may be adapted for use in connection with any typewriter having a revoluble platen but is here shown as applied to the well known Underwood typewriter. The platen is indicated at 1 and is secured to the axle 2 by the set screw 3 in the usual way. A fragmentary portion of the platen carriage is represented at 4 to which the detent 5 is pivoted. The detent is provided with the usual friction roller 6 which by means of the spring 7 is normally held between two adjacent teeth of the line space wheel 8 to position the same. It will be understood that the detent also serves to hold the line space wheel which is loosely mounted on the axle 2 from rotating when the platen is released therefrom and rotated independently as hereinafter described. In the present instance I have provided the line space wheel 8 with two toothed disks 9—10 connected thereto, but slidable axially in any suitable manner. In the present instance the line space wheel is provided with three laterally projecting tubular slide ways 11 and the toothed disk 9 is provided with three pins 12 projecting from the surface of the disk in the opposite direction and adapted to slide in the tubular slides. The second disk 10 is provided with holes through which the tubes 11 pass whereby the disk 10 is rendered slidable toward and from the line space wheel. It will be seen that this arrangement renders both disks 9 and 10 slidable independently and at the same time connects them to the line space wheel to revolve therewith. The disk 10 is also provided with three pins 13 which project laterally therefrom and extend through holes in the disk 9, which pins not only steady the disk 10 but are acted upon to move the disk to the disengaged position as will be hereinafter explained. The toothed disks 9 and 10 being independently movable, springs are provided for sliding or actuating the respective disks in one direction. As here shown the disk 9 is pressed outward from the line space wheel by the spring 14 which surrounds the hub 8$^a$ of the line space wheel and thrusts against the disk 9. The central hole in the disk 10 is enlarged sufficiently to permit the free passage of the spring 14 therethrough. The disk 10 is actuated to slide outward from the line space wheel by three springs 15, set in pockets in one face of the line space wheel and adapted to thrust against the surface of the disk 10. It will be understood that the particular style or arrangement of springs is not essential so long as the disks 9 and 10 are thrust outward from the line space wheel independently and with substantially the same force. The disks 9 and 10 and associated parts are inclosed in a cylindrical shell 16 the open end of which is toward the line space wheel 8. The shell 16 is provided with a hub 17 by which the shell is secured to the platen axle 2, in any suitable manner, thereby connecting it with the platen. Projecting radially inward from the shell 16 are two series or sets of wedge shaped teeth 18—19 of the same angular shape in cross section as the cuts between the teeth of the disks 9 and 10. In the present instance four teeth are shown in each series 18—19, but any desired number may be used. The two sets of wedge teeth 18 and 19 are spaced apart as indicated in Figs. 1 and 2 and adapted to coöperate respectively with the teeth of the disks 9 and 10. Sufficient space is left between the sets of wedge teeth 18 and 19 and between the teeth 19 and the line space wheel 8 for the passage of the teeth of the disks 9 and 10, when said disks are in the position shown in Fig. 2, in which position the platen may be rotated independently of the line space wheel. The wedge teeth of the two sets 18—19 are in alinement, while, as previously stated, the teeth of the disks 9—10 are not in alinement but one disk is a half tooth space in advance of the other, whereby when one disk is in full engagement with its wedge teeth the other will be out of engagement or held by the thin end of its wedge teeth.

The mechanism thus far described will hold the platen and line space wheel locked together to revolve in unison, but it is intended that the platen may be released and rotated independently of the line space wheel. For the purpose of releasing the disks 9—10 from the wedge teeth 18—19, a disk 20 is mounted between the toothed disk 9 and the wall of the shell 16, as indicated in Figs. 1 and 2. By means of rods 21 the disk 20 is connected with a push button 22 located beyond the end of the usual finger wheel 23 which is secured to the platen axle 2. The rods 21, it will be seen, pass through the end wall of the shell 16 and through suitable holes in the finger wheel 23. The disk 20 when pushed inward is adapted to strike the ends of the pins 13 and push the toothed disk 10 toward the line space wheel until it clears the wedge teeth 19; at the same time the disk 20 also picks up the toothed disk 9 and moves it back out of engagement with the wedge teeth 18 thus releasing the platen from the line space wheel and permitting it to be turned to any desired position, the line space wheel being held from rotation by the detent 5.

From the fragmentary views of Figs. 5 and 6 it will be understood that when the platen and line space wheel are in a certain relation, the toothed disks 9 and 10 will stand in the position indicated in Fig. 6, in which the toothed disk 10 is shown in full engagement with the wedge tooth 19. If the platen be advanced a half tooth from the position shown in Fig. 6, then the other disk 9 will come into full engagement with the corresponding wedge teeth 18. If there is a quarter of a tooth difference between the platen and line space wheel then the relation between the toothed disks and wedge teeth will be substantially as indicated in Fig. 5. In any intermediate position the engagement will vary from full engagement of one disk to full engagement of the other with the respective wedge teeth. Thus in any position of the platen with reference to the line space wheel the springs 14 and 15 will force out the respective disks 9—10 to the proper relative amount of engagement with the wedge teeth 18—19 and secure the platen and line space wheel together to revolve in unison.

It will be understood that the number of toothed disks may be varied and various modifications in the specific details of construction may be made without departing from the spirit and scope of the invention as set forth in the claims.

I claim:

1. In a platen release for typewriting machines, the combination with a platen and a line-space wheel means to connect said platen to said line-space wheel, said connecting means including a plurality of axially alined members, provided with radially extending teeth, a corresponding plurality of wedge-shaped members adapted to enter between the teeth of the first-named members transversely of the plane of the said members, one of said plurality of members being movable and adapted to be engaged with, or disengaged from the other members, the wedging engagement varying with the relative rotated position of said members, whereby the platen and line-space wheel may be connected at any relative rotated position to move in unison, or disconnected for relative independent movement, and means for actuating said movable members.

2. In a platen release for typewriting machines, the combination with a platen and line-space wheel of means to connect said platen to said line space wheel, said connecting means including a set of axially alined toothed members, a corresponding set of coöperating wedge-shaped members, one set of members being movable and adapted to be engaged with or disengaged from the other set, the wedging engagement varying with the relative rotative position of said sets of members, whereby the platen and line-space wheel may be connected at any relative rotative position to move in unison or disconnected to move independently of each other and means for actuating said movable set of members.

3. In a platen release for typewriting machines the combination with a platen and line-space wheel of means to connect said platen to said line-space wheel, said connecting means including a set of members comprising a plurality of toothed disks, a coöperating set of members comprising elongated wedge-shaped teeth, one of said sets of members being movable and adapted to be engaged with or disengaged from the other set whereby the platen and line-space wheel may be connected to move in unison or disconnected to move independently of each other and means for actuating said movable set of members.

4. In a platen release for typewriting machines, the combination with a platen and line-space wheel of means to connect said platen to said line-space wheel, said connecting means including a set of axially alined toothed members, a corresponding set of coöperating wedge-shaped members, one of said sets of members being movable and adapted to be engaged with or disengaged from the other set whereby the platen and line-space wheel may be connected at any relative rotative position to move in unison or disconnected for relative independent movement, resilient means for independently actuating the respective members of said movable set of members into engagement with the corresponding members of the other set and manually operated means for disengaging said sets of members for rotating the platen independently of said line-space wheel.

5. In a platen release for typewriting machines the combination with a platen and line-space wheel of means to connect said platen to said line-space wheel, said connecting means including a set of members comprising a plurality of toothed disks, a set of coöperating members comprising elongated wedge-shaped teeth, one of said sets of members being movable and adapted to be engaged with or disengaged from the other set whereby the platen and line-space wheel may be connected to move in unison or disconnected for independent relative movement, springs for actuating each member of said set of movable members to bring about engagement thereof with the respective coöperating members of the other set and means for simultaneously disengaging the members of one set from the members of the other set for rotating the platen independently of said line-space wheel.

6. In a platen release for typewriting machines the combination with a platen and line-space wheel of means to connect said platen to said line-space wheel, said connecting means including a set of axially alined toothed members, a corresponding set of coöperating wedge-toothed members, the several members of one of said sets, each member of which has the same number of teeth, being so disposed that corresponding teeth of adjacent members are out of alinement, one set of members being movable and adapted to be engaged with or disengaged from the other set whereby the platen and line-space wheel are connected to move in unison or disconnected for independent relative movement and means for actuating said movable members.

7. In a platen release for typewriting machines the combination with a platen and line-space wheel of means to connect said platen to said line-space wheel, said connecting means including a set of members comprising a plurality of toothed disks, the disks being so arranged that corresponding teeth of adjacent disks are out of alinement, a set of coöperating members comprising elongated wedge-shaped teeth disposed transversely of the disks, one set of said members being movable and adapted to be engaged with or disengaged from the respective coöperating members of the other set whereby the platen and line-space wheel may be connected to move in unison or disconnected for independent relative movement, resilient means for independently actuating the members of said movable set in one direction and manually operated means for simultaneously actuating said movable members in the opposite direction.

8. In a platen release for typewriting machines, the combination with a platen and line-space wheel of means to connect said platen to said line-space wheel at any rotative position of one with respect to the other to revolve in unison, said connecting means including a plurality of axially alined toothed members, a corresponding plurality of members comprising elongated wedge-shaped teeth, one set of said members being movable to engage and disengage the corresponding members of the other set and means for independently actuating the movable members.

9. In a platen release for typewriting machines, the combination with a platen and line-space wheel of means to connect said platen and said line-space wheel together to revolve in unison, said connecting means including a plurality of axially alined toothed members, spaced apart axially, a corresponding plurality of members with elongated wedge-shaped teeth, the teeth of adjacent members being spaced apart to permit circumferential movement therebetween of the teeth of the respective members of the other set, the teeth of one set of members being circumferentially displaced so that corresponding teeth of adjacent members thereof are out of alinement, resilient means for independently actuating said movable members to engage the other members respectively and means for disengaging said members for moving the platen independently of said line-space wheel.

10. In a platen release for typewriting machines, the combination with a platen and line-space wheel of means to connect said platen and said line-space wheel together to revolve in unison, said connecting means including a plurality of independently movable toothed disks in axial alinement and spaced from each other and from said line-space wheel, a corresponding plurality of circumferential rows of wedge-shaped teeth spaced apart transversely of said disks, and adapted to coöperate respectively therewith, said disks being angularly displaced so that the teeth of adjacent disks are out of alinement, resilient means for actuating each of said disks independently into engagement with the corresponding row of wedge teeth and hand operated means for disengaging said disks and wedge teeth for turning the platen independently of said line-space wheel.

In witness whereof I have hereunto set my hand in the presence of two subscribing witnesses.

MARQUIS H. LOCKWOOD.

Witnesses:
 FRANK F. KIRKPATRICK,
 W. WECKMANN.